INVENTOR.
ORLANDO G. MOLINA
BY
ATTORNEY

INVENTOR.
ORLANDO G. MOLINA
BY
[signature]
ATTORNEY

*INVENTOR.*
ORLANDO G. MOLINA
*BY*
ATTORNEY

INVENTOR.
ORLANDO G. MOLINA
BY
ATTORNEY

*INVENTOR.*
ORLANDO G. MOLINA
*BY* [signature]
ATTORNEY

*INVENTOR.*
ORLANDO G. MOLINA

*BY* [signature]

ATTORNEY

Sept. 26, 1967 O. G. MOLINA 3,344,345

RESOLVING METHOD COMPRISING PRINTING CAUSED BY IMPINGEMENT OF A PARAMAGNETIC PARTICULATE

Original Filed Jan. 29, 1962 8 Sheets-Sheet 7

INVENTOR.
ORLANDO G. MOLINA
BY
ATTORNEY

INVENTOR.
ORLANDO G. MOLINA
BY
ATTORNEY 3,344,345
Patented Sept. 26, 1967

3,344,345

RESOLVING METHOD COMPRISING PRINTING CAUSED BY IMPINGEMENT OF A PARAMAGNETIC PARTICULATE

Orlando G. Molina, Westminster, Calif., assignor to North American Aviation, Inc.

Continuation of application Ser. No. 169,553, Jan. 29, 1962. This application Feb. 3, 1966, Ser. No. 532,505
31 Claims. (Cl. 324—38)

Figure 1:
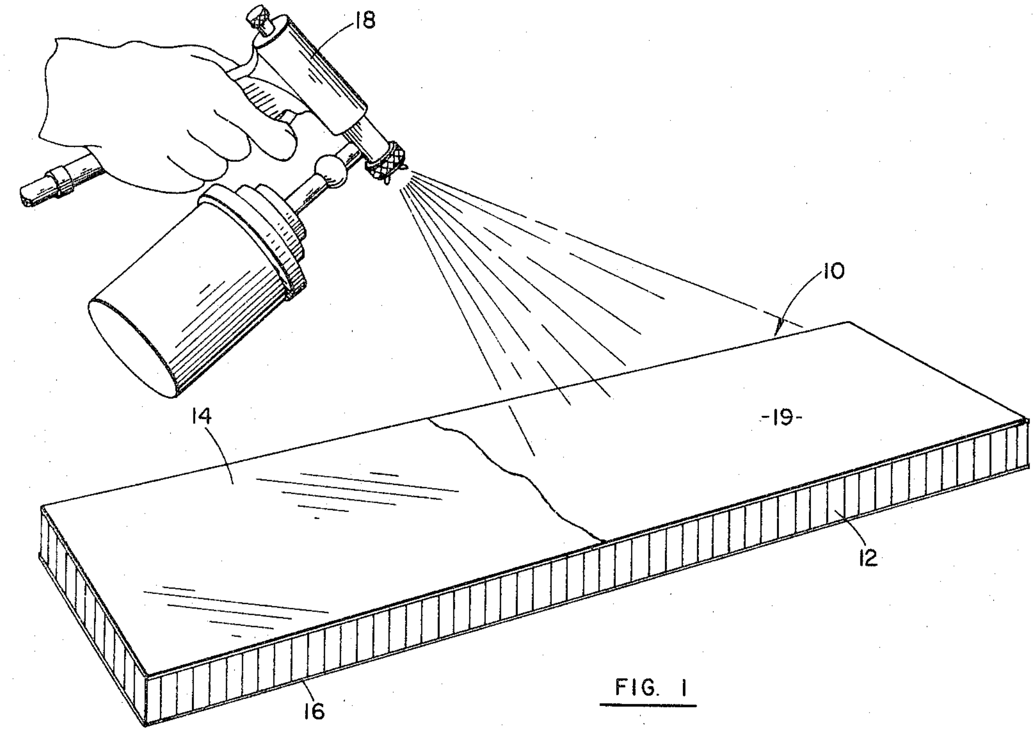

This is a continuation of application Ser. No. 169,553, filed Jan. 29, 1962 and now abandoned.

This invention concerns method and means for resolving physical, metallurgical, and stress configurations in structures which cannot be discerned by the normal visual process. More particularly, the invention contemplates an improved technique useful in defining subsurface, microscopic or otherwise invisible structural changes and relationships such as required in fabrication, inspection and testing of metallic workpieces.

Although the invention is of wide applicability in resolving constituent parts, stresses and minute details in workpieces of different materials for any purpose whatsoever, it will be described herein by way of example in connection with the fabrication, inspection and testing precipitation hardenable stainless steel workpieces of various different forms including sandwich-type panels used for skin surfaces on advanced supersonic aerial vehicles and missiles. In making such panels, slabs of honeycomb core material of thin metal foil are accurately cut to produce the necessary variation in core thickness throughout the panel, and are thereafter brazed to top and bottom metal panel face sheets having a thickness normally within the range from .007 to .125 inch. Lightweight panels such as described above are used extensively to form the external surfaces of vehicles of the stated type, the separate panel sections being welded together along their adjacent edges to form such surfaces. In the control of boundary layer airflow over some of the vehicle surfaces, depending upon their location thereon, it is occasionally necessary to perforate such panels with a plurality of tiny holes by drilling the same through the outermost panel face sheet whereby a hole is centered between the interstices of each cell in the honeycomb core material. Due to the extremely sensitive nature of the stated panels with respect to their complex internal structure and thin walled components, accurate location of each of the perforations is essential.

Moreover, the fabrication problems described herein are additionally complicated by the fact that new materials and alloys not heretofore known in the manufacture of conventional supersonic vehicles are used in the panels mentioned above. Illustrative of these materials is the alloy commonly designated PH15–7Mo, comprised of the following components:

| | |
|---|---|
| Carbon ____________percent maximum__ | .09 |
| Manganese ____________________do____ | 1.00 |
| Phosphorous __________________do____ | .04 |
| Sulphur ______________________do____ | .03 |
| Silicon ______________________do____ | 1.00 |
| Chromium __________________percent__ | 14.00 to 16.00 |
| Nickel _______________________do____ | 6.5 to 7.5 |
| Molybdenum ___________________do____ | 2.00 to 3.00 |
| Aluminum _____________________do____ | .75 to 1.5 |
| Iron ______________________________ | Balance |

While the stated percipitation hardenable alloys including PH15–7Mo provide great strength at elevated temperatures, such materials are characterized by a great propensity for crack propagation, resulting in an extreme sensitivity to minute notches, cuts or scratches on specimen or edges. Therefore, misalignment of the stated apertures whereby scratches or other damage to the honey comb cell walls might be caused during the drilling operation must be assiduously avoided.

Of further significance in the fabrication of vehicles of the stated type is the fact that percipitation hardenable stainless steels derive their maximum strength from the hardening process which involves transformation of each metallic specimen from ustentite to martensitic structure. Where such transformation is not uniform and complete in a workpiece, regardless of its form, the presence of veins or stratas of austenite in the workpiece constitute potential areas of failure when the finished part is subjected to severe structural loads and temperature extremes such as those encountered in the operation of vehicles of the stated type. Therefore, it is essential in the fabrication of such vehicles that accurate and inerrant means of detection be provided to resolve the precise metallurgical composition of the material in such workpieces whereby traces of metallurgical structure other than martensite may be located and identified.

Of further importance in the problem situation discussed above, welding of extremely thin gauge sheet metal to join adjacent lightweight panels along their confronting edges presents formidable problems not heretofore encountered. As in welding generally, the puddle temperature is normally raised much higher than the melting point of the base metal, and some of the welding heat permeates the base metal surrounding the weld area. Changes such as expansion and shrinkage of the heat affected area normally result from the welding operation, as well as changes in physical properties such as strength and ductility. Moreover, metallurgical effects such as recrystallization and heat treatment occur due to the application of welding heat. Notable among the effects of such heat treatment, for example, is the annealing of workpiece material in the previously transformed martensitic structure of the workpiece, resulting in a highly deleterious effect on the physical strength thereof. Therefore, accurate and reliable detection of metallurgical effects such as those mentioned above, particularly with respect to residual stresses caused by shrinkage during cooling of molten metal in the area of the weld seam and by phase transformation of the granular structure in the base metal beyond the stated seam, are critically important.

In further connection with the metallurgical examination of workpieces, it is also necessary to determine that the machinability or the structural reliability of workpieces such as channel members, for example, has not been impaired by the metallurgical configuration of the billet from which the workpiece is fabricated. This examination normally entails polishing a cross-sectional cut through the channel, etching the polished surface, photographing the etched surface, and enlarging the photograph for detailed study. As applied to hardened steel workpieces, the stated process involves 4–6 hours of polishing in addition to the time required for the etching agent to act on the polished surface. The conventional method of metallurgical examination thus described is elaborate, costly and time consuming, hence is poorly suited for mass-production use.

Accordingly, it is a principal object in this case to provide improved method and means for accurately resolving metallurgical configurations in metallic specimens.

It is another object in this case to provide method and means as stated in the above object characterized by rapidity, economy, and non-destructive effect upon the specimen.

It is another object of this invention to provide improved method and means for accurately resolving stress configurations in metallic specimens.

It is a further object of this invention to provide improved method and means for accurately resolving granular configurations in metallic masses.

It is also an object in this case to provide method and means as set forth in these objects whereby a permanent record of the results from use thereof may be rapidly obtained.

It is another object in this case to provide improved method and means for rapid and repeated visual determination of stress patterns in metallic specimens continuously and simultaneously during actual loading thereof.

It is an additional object of this invention to provide improved method and means for delineation of internal structural details in non-destructive inspection of workpieces wherein such details are not discernible by the unaided vision.

It is also an object in this case to provide method and means as set forth in these objects applicable to inspection of workpieces of honeycomb panel type having a relatively low density core affixed to relatively high density face sheets on either side thereof.

Figure 2:
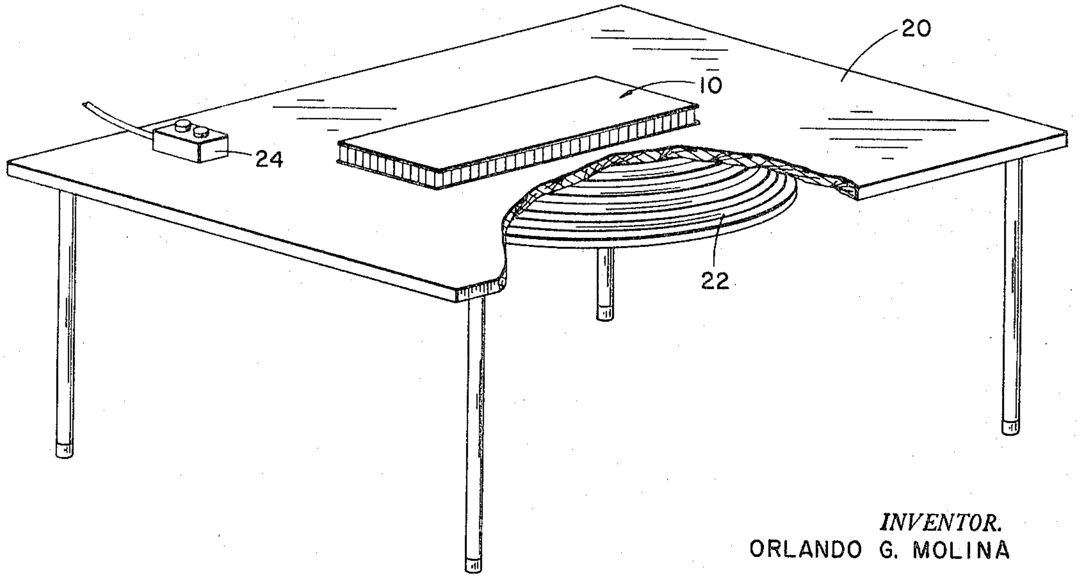
Figure 3:
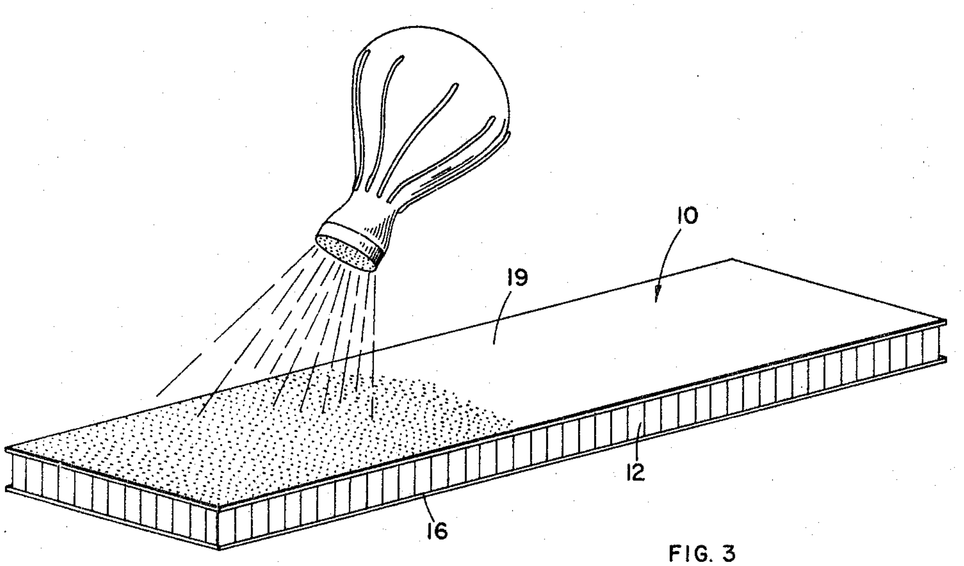
Figure 4:
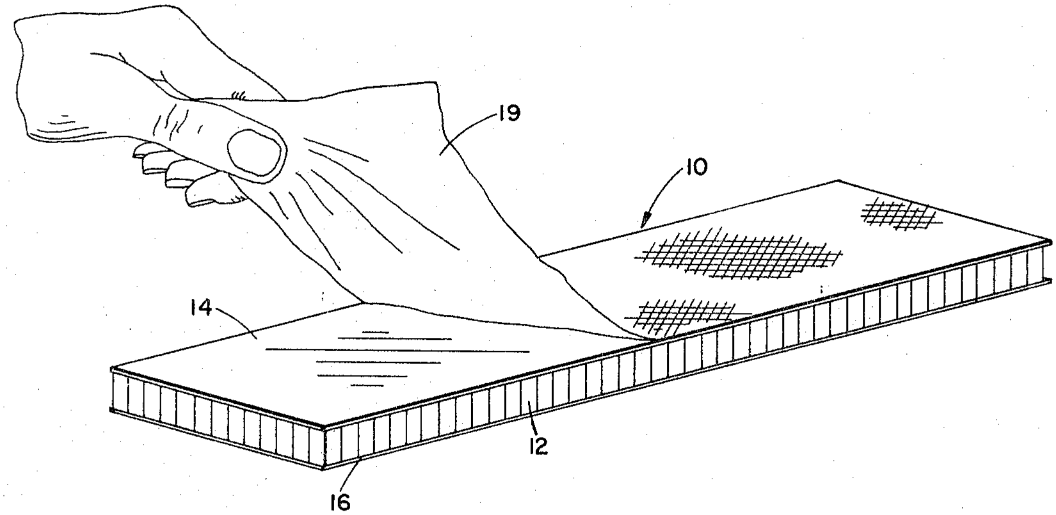
Figure 20:
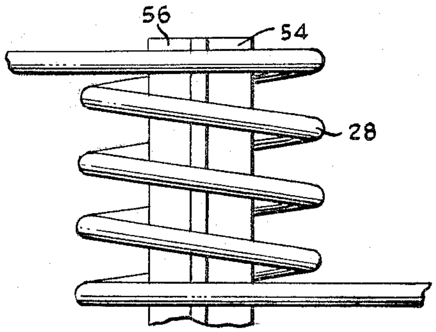
Figure 5:
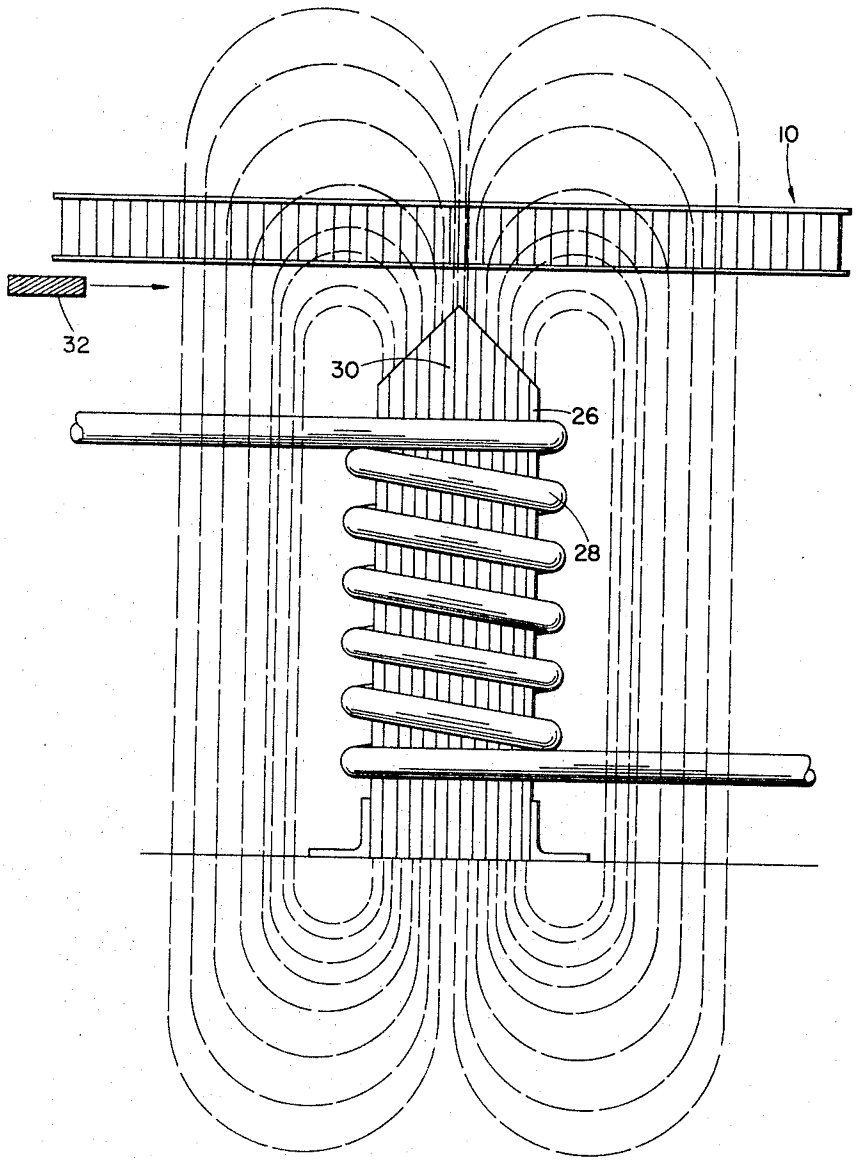
Figure 6:
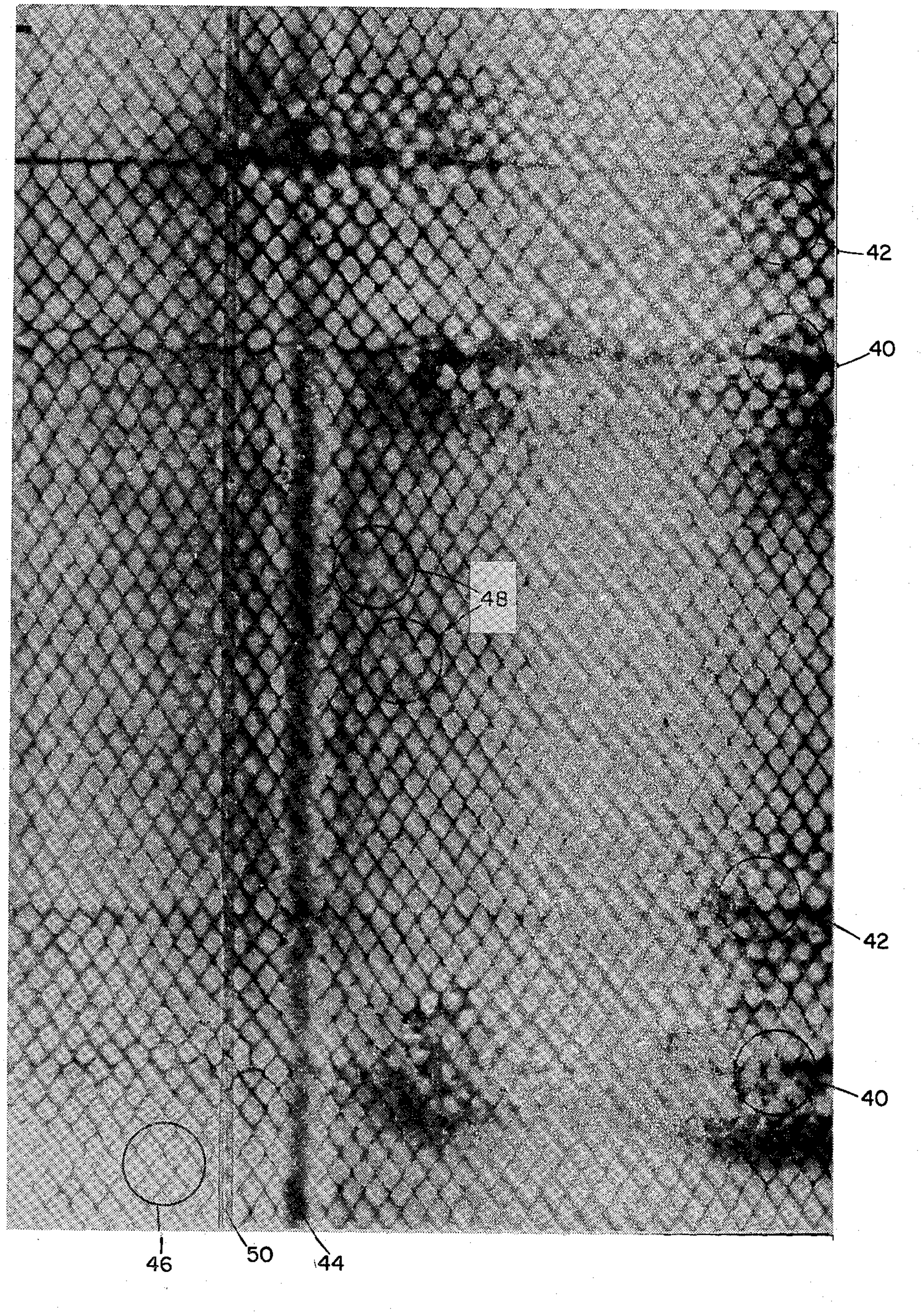
Figure 7:
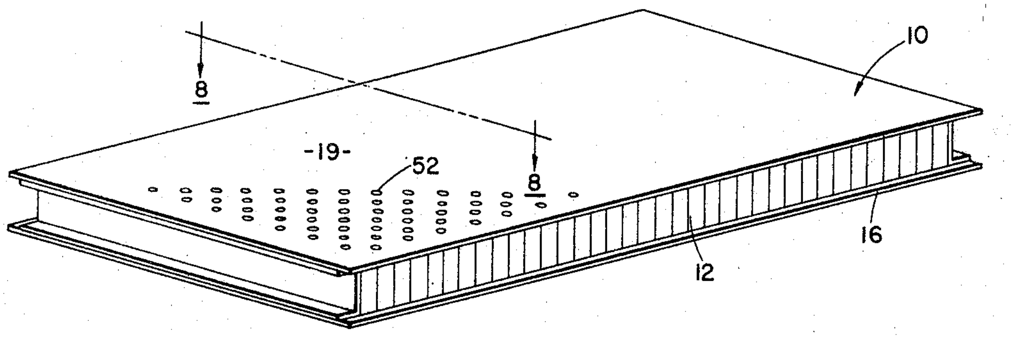
Figure 8:
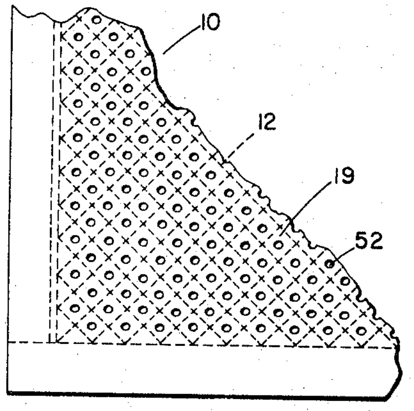
Figure 12:
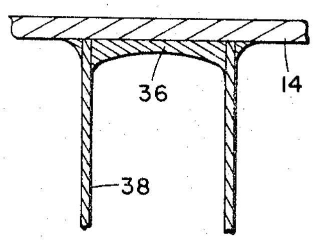
Figure 13:
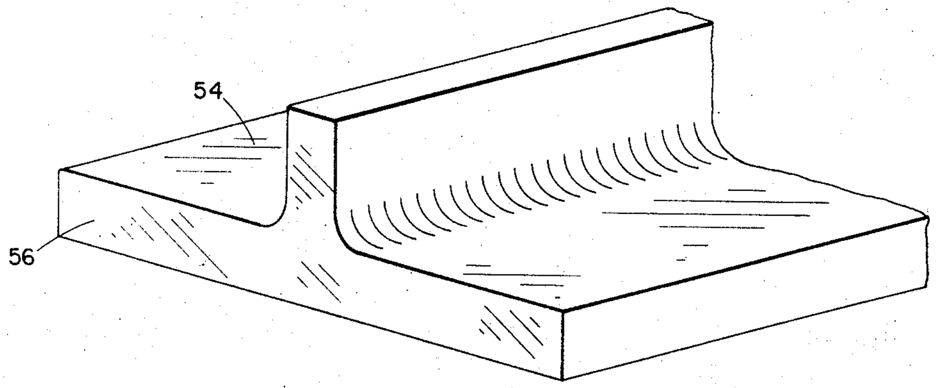
Figure 14:
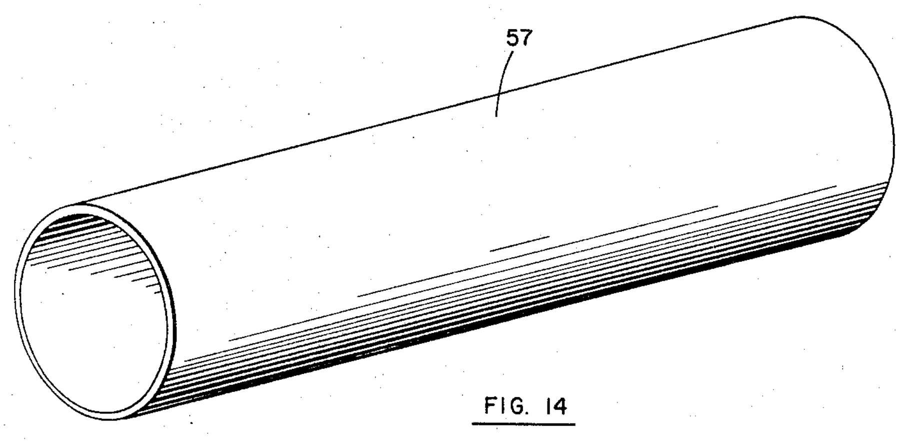
Figure 17:
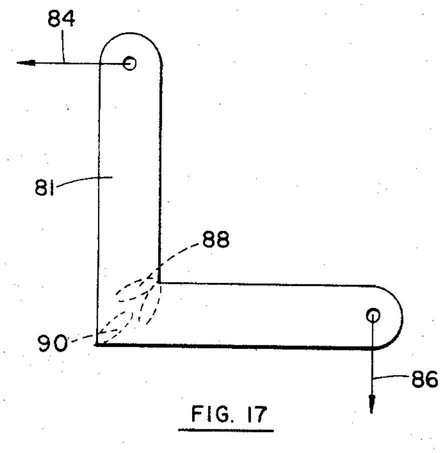
Figure 15:
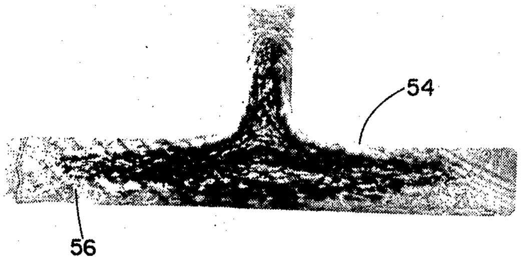
Figure 16:
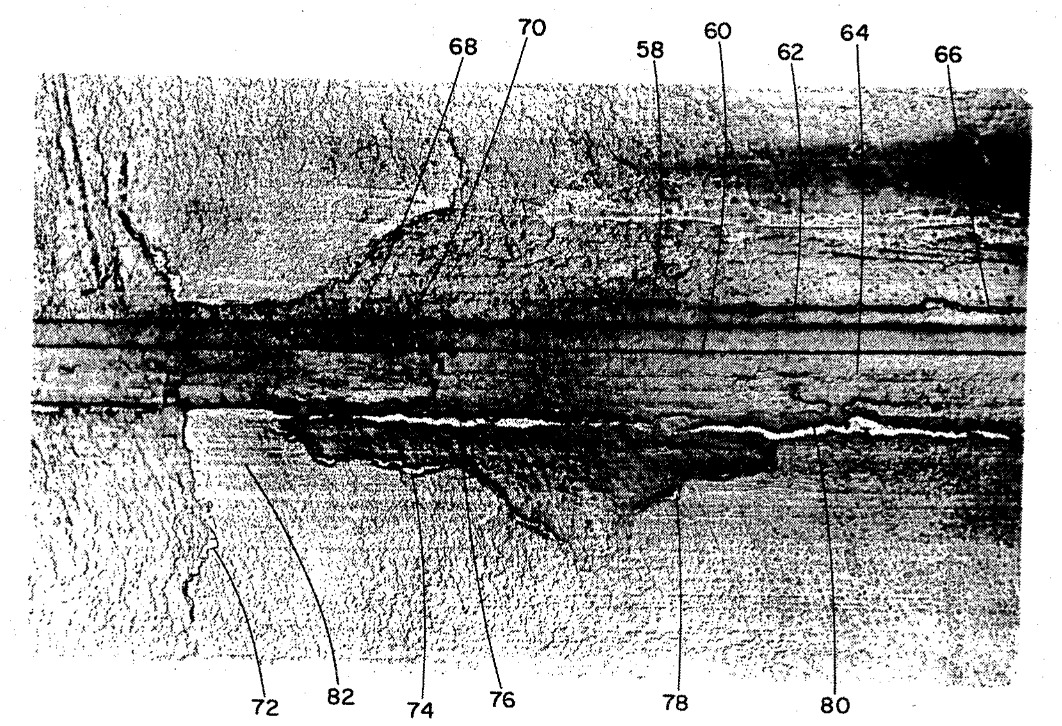
Figures 18, 19:
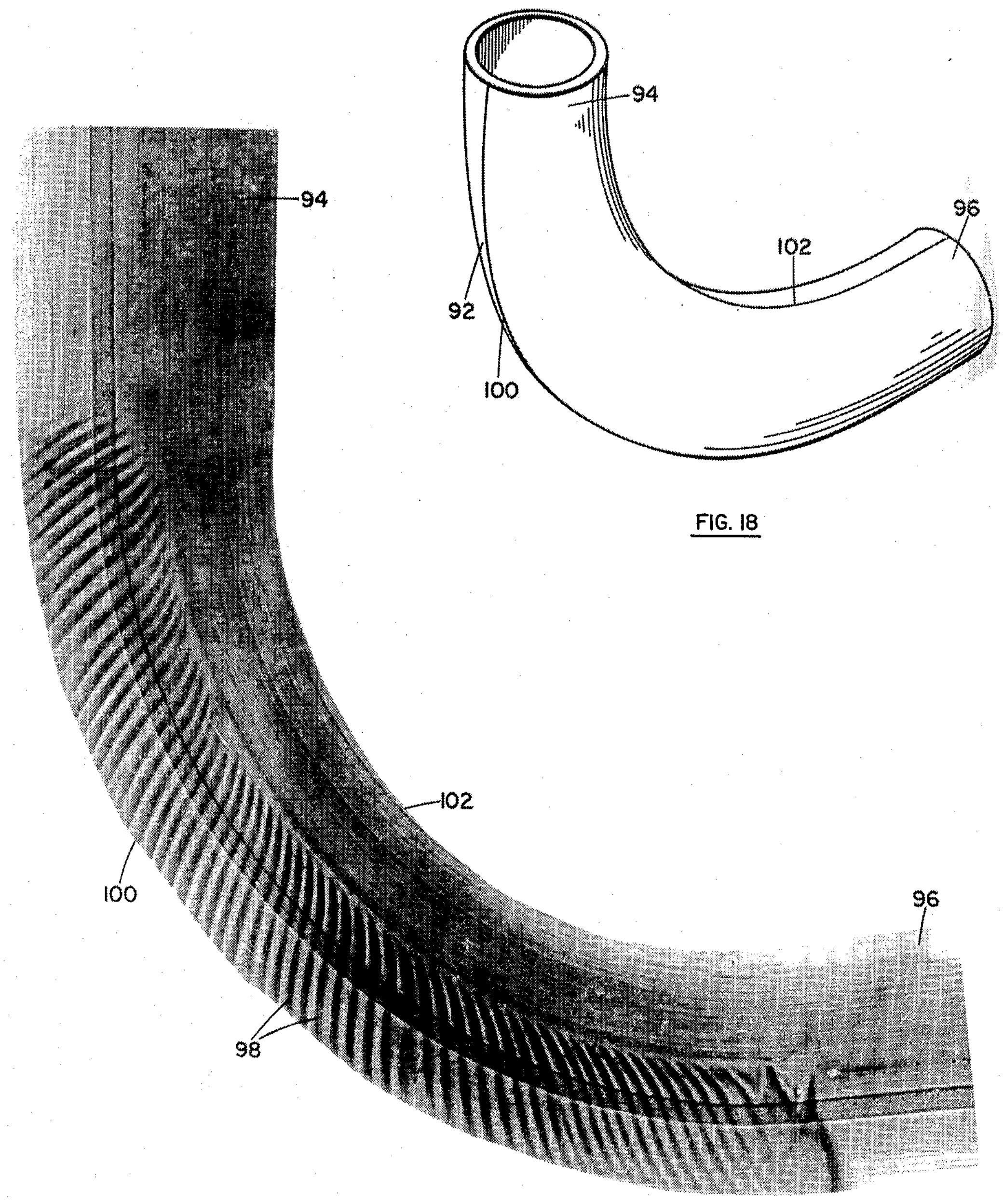

Other objects and advantages of the instant invention will become apparent upon a close reading of the following detailed description of an illustrative embodiment of the invention, reference being had to the accompanying drawings wherein:

FIGURE 1 shows a general perspective view of a honeycomb panel workpiece being processed in accordance with the first step of the method disclosed herein, FIGURE 2 shows a general perspective view of the workpiece of FIGURE 1 positioned over a coil for passing a magnetic field through the workpiece, FIGURE 3 shows particles responsive to a magnetic field being applied to the workpiece of FIGURES 1 and 2 in accordance with another step in the novel method disclosed herein, FIGURE 4 shows a perspective view of a permanent record of the magnetic inspection accomplished as shown by FIGURES 1 through 3 being removed from the stated workpiece, FIGURE 5 shows a schematic view in cross section taken through a coil having an iron core to produce an oriented and intensified magnetic field through the panel workpiece of FIGURES 1 through 4, FIGURE 6 shows a printed record of the results of the magnetic inspection accomplished by the steps illustrated in FIGURES 1 through 5, FIGURE 7 shows a panel workpiece after processing by the steps illustrated in FIGURES 1 through 5 as applied to a fabrication step in making holes through a panel face sheet, FIGURE 8 shows an isolated plan view of a portion of the workpiece shown in FIGURE 7, FIGURES 9, 10, 11 and 12 show isolated cross-sectional views taken through a face sheet and related portions of cell walls in the honeycomb core of the panel shown by FIGURES 1 through 8, illustrating different brazed joint defects which may occur in a single workpiece, FIGURE 13 shows an isolated perspective view of a workpiece having the form of an extruded panel member of inverted T cross-section, FIGURE 14 shows a tubular workpiece having a welded seam longitudinally directed along one side thereof, FIGURE 15 shows a permanent record of the metallurgical inspection results from the workpiece shown in FIGURE 13 obtained from the novel method disclosed herein, FIGURE 16 shows a permanent printed record of the results from the novel method disclosed herein practiced on a workpiece of the type shown in FIGURE 14, FIGURE 17 shows an illustrative example of the novel method disclosed herein used for determining stress patterns in a specimen to which external loads are applied, FIGURE 18 shows a perspective view of a tubular seam welded workpiece after being bent into a curved shape from an initially straight condition, FIGURE 19 shows a permanent record of the residual stress pattern resulting in a workpiece similar to that shown in FIGURE 18 as revealed by the novel resolving method disclosed in the instant case, and FIGURE 20 shows a simplified elevational view of an elongate workpiece such as shown in FIGURE 13 during inspection using a coil such as disclosed in connection with FIGURE 5.

Referring to the drawings described briefly above and particularly to FIGURE 1, it may be seen that the inventive method in this case may be practiced on a workpiece such as that generally designated by reference numeral 10 comprising a low density core of honeycomb material 12 brazed to upper and lower face sheets 14 and 16, respectively, of greater density than core 12. Workpiece 10 may form a surface member in a high speed aerial or space vehicle as discussed above, having thin walled construction of advanced alloy stainless steel material and characterized by extreme sensitivity to brazing heat. Since strong, uniform and continuous attachment of the core to the face sheet is essential, and depends upon effective distribution of brazing alloy to form fillets around each cell in the honeycomb where the cell walls contact the face sheet, inspection of the finished panel is commensurately important to insure structural integrity in such vehicles. In the illustrative example of FIGURE 1, the novel method in this case as applied to inspection of workpiece 10 may begin by initially coating the workpiece with an opaque material which may take the form of a suitable quick-drying liquid applied to the workpiece by spraying, dipping or brushing. The coating thus applied must be magnetically porous in the sense of passing magnetic flux lines from an external magnetic source into the coated workpiece. Where a workpiece surface is capable of being printed upon by the process described below due to inherent characteristics of the workpiece material, no separate coating step is necessary. The stated coating material, where necessary, may comprise any of several known paints, vinyls, or lacquers, preferably white, capable of being sprayed by use of an air hose attachment or spray gun as indicated at 18 in FIGURE 1. Illustratively, a mixture of 19.1% vinyl chloride resin, 61.4% aromatic solvents, 14.1% ketones, and 5.4% plasticizers with added pigment of desired color has been found advantageous.

After the coating material descibed above has dried completely, forming a layer 19 upon which printing may be accomplished, workpiece 10 may then be placed in close proximity with a suitable source of magnetic force whereby a magnetic field may be directed through the workpiece. Thus, for example, support means in the form of a table 20 may be provided as shown in FIGURE 2 for supporting workpiece 10 in a stationary condition and in close proximity with a generally flat coil 22 affixed or otherwise supported on table 20. Electrical controls of conventional type may be arranged as indicated at 24 for connecting coil 22 with a suitable source of power to initiate or terminate the magnetic action of the coil with respect to workpiece 10. In connection with placement of the workpiece, it is an important feature of the novel method disclosed herein that the lines of flux resulting from energization of coil 22 or other magnetic source occur in a direction whereby the lines penetrate the coated surface of workpiece 10 and are not parallel to the stated surface, with best results achieved when the stated lines are generally perpendicular to the coated surface.

Following the initial steps discussed above, the surface of workpiece 10 upon which printing is to occur is sprinkled with a paramagnetic particulate, or minute filings from a suitable material responsive to magnetic force and inherently capable of marking the coated surface of the workpiece when rapidly impinged thereagainst in a vibratory manner under the action of the discontinuous magnetic field. Alternatively, the particles may be mixed with a suitable printing agent either in liquid or powdered form. For example, particles of iron oxide ($Fe_2O_3$) having a reddish color have been found to produce acceptable results in practicing the novel method disclosed herein. The magnetically responsive particles may be permanently magnetic or not, and preferably are paramagnetic. After dusting the workpiece with the particulate discussed above in connection with FIGURE 3, or else simultaneous with the dusting thereof, workpiece 10 is exposed to a magnetic field of varying intensity such as produced by alternating current or pulsating direct current. Use of appropriate switch means or of alternating current to power an electromagnet is advantageous in that a periodic reversal in the direction of magnetic force results, whereby the particles mentioned above are violently impinged against the surface of workpiece 10. In any case, the general direction of the lines of flux should pass generally vertically through the panel as indicated, for example, by FIGURE 5, or should otherwise penetrate the coated surface of workpiece 10. In connection with the stated properties of the magnetic field in respect of workpiece 10, the use of a core within an elongate coil arranged in the manner indicated by FIGURE 5 has been found advantageous in practicing the novel method discussed herein. In the stated figure, generally cylindrical coil 28 may be seen positioned below workpiece 10 in a relationship similar to that between flat coil 22 and the workpiece shown in FIGURE 2. The laminated core 26 is situated within coil 28 and is provided with a double beveled or wedge shaped at one extremity thereof as indicated by reference numeral 30 in FIGURE 5. The use of a core arranged in the configuration and relationship shown, for example, by core 26 in FIGURE 5 tends to collimate or forcus the lines of flux emanating from coil 28 in the region of workpiece 10 whereby movement of the workpiece across the top of the core toward the left or the right as seen in FIGURE 5 results in improved delineation of the pattern formed on the coated surface of workpiece 10 by the particles acting thereon. Depending upon the size of workpiece and the area upon which magnetic printing is to occur, only momentary exposure of the workpiece to the magnetic field generated by coil 28 and core 26 is necessary. The period of exposure in the case of parts having low mass such as honeycomb panels may be less than one second, with sufficient delineation of the printed pattern resulting during this brief period. As a result of this feature, the inventive process disclosed herein is adaptable for use with power units of conventional type capable of providing high current flow such as 2000 amperes or more for extremely short duration without resulting in burnout of the coil or other circuit components. The stated feature also renders the inventive process amenable for use with workpieces of substantial mass requiring higher current flow and stronger magnetic fields than that permitted by conventional magnetic inspection methods wherein such flow must be continuously maintained over a substantial period, involving commensurately greater risk of overheating or burnout.

It is also an important feature of the inventive method disclosed herein that improved results are achieved by introducing a diamagnetic elements of suitable material between the magnetic source and the workpiece to which the flux field is applied. The selection of such material depends upon its magnetic properties, and illustratively aluminum has been found to produce the desired result. The material should be of the type which interrupts the unidirectional path of lines of magnetic flux emanating from coil 22, 28 or core 26 and causes localized dispersion of such lines. Further illustrative of materials having the necessary properties are beryllium, carbon, copper and bismuth. In practicing the novel method disclosed herein, a sheet of material of the stated type such as 24ST aluminum alloy may be placed in operative relationship between coil 22 and workpiece 10, or alternatively, a bar of the stated material may be passed from one side to the other over the coil during the application of magnetic force to panel 10 by the coil as indicated by element 32 shown in FIGURE 5. The effect of this action is to accelerate the agitation of the magnetic particles on workpiece 10 whereby the printing action thereof on layer 19 is accelerated and improved delineation of the printed pattern results.

Following completion of the printing process by brief exposure of workpiece 10 to a magnetic field as discussed above, the current through coil 28 may be terminated or the workpiece otherwise removed from the magnetic field, after which the magnetic particles may be dumped or otherwise removed from layer 19 by appropriate means such as inverting panel 10. The printed pattern resulting from the procedure discussed above may then be studied in detail while still attached to the workpiece, or the coating material may be removed by stripping in one continuous sheet as shown by FIGURE 4 if the strippable vinyl illustratively disclosed above is employed in practicing the inventive method disclosed herein. Prior to removal of the stated strippable coating, the printed surface may be sprayed or otherwise coated with a clear quick-drying solution such as clear vinyl lacquer which will serve to protect the printed impression on the initial vinyl coating and prevent smudging or similar adverse effects on the pattern. If for any reason it becomes desirable to repeat the printing step discussed above before removal of the strippable coating from the workpiece, the printed pattern thereon may be erased by wiping the coated surface of the workpiece with a cloth, dry sponge or similar means. With the coated surface thus cleaned, the printing step described above may be repeated. The cleaning and reprinting technique thus described may be repeated indefinitely on the same coated workpiece as the printed pattern is easily cleaned until fixed permanently by an overlying coat of clear lacquer as mentioned above.

FIGURE 6 shows an example of a printed pattern resulting from use of the inventive method disclosed herein on a workpiece comprising a lightweight panel having a honeycomb core of thin metallic foil with a face sheet brazed to either side of the core. In the fabrication of such panels, a section of core material such as indicated at 12 in FIGURE 1 is initially cut to the desired thickness and size, and overlaid on either side with a thin sheet of brazing alloy in foil form. In contacting relationship with the brazing alloy foil on either side of the core material, metallic sheets 14 and 16 are placed whereby the application of heat in a sufficient amount will cause the brazing alloy to liquify or melt and to form fillets adjacent the lines of contact between the honeycomb cell walls and the stated sheets to join the same securely together when the brazing alloy solidifies upon cooling. Due to capillary characteristics of the brazing alloy, the maximum gap between structural elements which are sought to be joined by this method is .040 inch. Thus, where an excessive gap occurs as indicated at 34 in FIGURE 9, a bead 36 of brazing alloy may form in the general location of a cell wall 38 of the honeycomb core material 12, but the surface tension thereof when the alloy is in the liquid state will not permit contact of the bead with the confronting edge of the cell wall. In consequence of the gap shown by FIGURE 9, if the stated condition occurs with excessive frequency throughout a panel workpiece, weak and structurally unsafe panel will result. This condition of defective joinder between core material 12 and face sheets 14 or 16 will not be detected by conventional X-ray or magnetic inspection means, since such means are either unsuited for honeycomb panel inspection or else the patterns produced therefrom are too fuzzy or too foggy to define with particularity the cell walls, the fillets adjacent thereto, or any useful indication of the gap between cell wall edge and face sheet surface where such gap occurs. The pattern from X-ray inspection may reveal the presence of a brazing alloy bead at the general location of the cell walls without providing an indication that the bead thus formed is not attached to the cell wall.

Figures 10, 11:
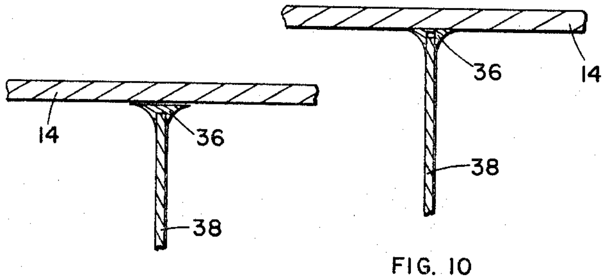

Other types of defects in brazed joints between honeycomb cell wall edges and face sheet surfaces in panels such as described above may be seen from FIGURES 10 and 11. Both stated figures show defects resulting from failure of the brazing alloy to form a normal joint with one or the other of two components sought to be joined. Failure to form a normal attachment between the brazing alloy and the workpiece component surface may result from various causes such as oxidation of the surface or films and impurities of various types remaining on the surface due to insufficient cleaning or other preparation for the brazing process. Thus, FIGURE 10 shows brazing alloy 36 forming a secure bond or joint with face sheet 14 and embracing cell wall 38 without adhering thereto, while FIGURE 11 shows brazing alloy 36 securely joined to cell wall 38 but failing to adhere to face sheet 14. Defective joints between core material and face sheets as described above have no holding strength whatsoever to prevent separation of the panel components when the workpiece is subjected to external loads, and none of the stated defects is detectable by conventional inspection methods. However, the novel inspection method disclosed herein has been found extremely effective in revealing the defects discussed above and illustrated in FIGURES 9, 10 and 11 as well as many other defects not specifically treated herein.

A further type of defect causing occasional difficulty in fabrication of brazed panels such as those discussed herein is shown by FIGURE 12. This type of defect is related to the phenomena whereby brazing alloy foil of constant thickness which is initially distributed uniformly throughout the panel workpiece, upon becoming liquid due to application of brazing heat, occasionally becomes concentrated in localized areas resulting in oversized fillets or in the formation of puddles of excess alloy which may occasionally cover completely the face sheet internal surface situated between the walls of a single cell as shown by FIGURE 12. This concentration of brazing alloy may occur in a single isolated cell or in groups of cells over a localized area.

Figure 9:
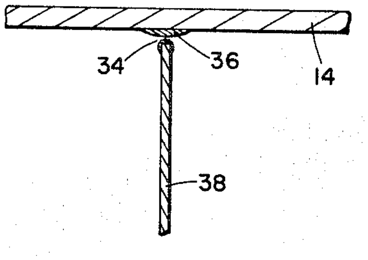

Evidence of the various defects discussed above and illustrated in FIGURES 9 through 12, in addition to other defects, may be seen from the example of inspection test results shown in FIGURE 6. FIGURE 6 is a printed copy of a layer 19 taken from a honeycomb panel workpiece subjected to the process illustrated in FIGURE 5, tested by use of a vinyl layer having the composition set forth above and red iron oxide particles, and further using 1600 amps of alternating current at 60 c.p.s. for 6 seconds' duration. Thus, for example, reference numeral 40 denotes an area of excessive brazing alloy forming puddles between the cell walls as shown in FIGURE 12, while reference numeral 42 denotes a zone of partial puddling wherein incomplete coverage of the panel face sheet area occurs between the cell walls, the effect of which is to produce oversized fillets. Also, an elongated zone wherein attachment of the cell walls to the face sheet has not occurred may be seen from FIGURE 6 and is designated generally by reference numeral 44. Zone 44 apparently resulted from excessive gap between cell walls and the face sheet as shown by FIGURE 9, and was caused perhaps by partial crushing of the delicate core material during assembly of components before the brazing heat was applied. Several isolated instances of defective joints between cell wall edges and face sheet surfaces are indicated in FIGURE 6 by reference numerals 46 and 48. The area designated 46 reflects the condition shown by FIGURE 10, while 48 designates a condition such as that shown by FIGURE 11. The generally vertical line denoted by reference numeral 50 in FIGURE 6 results from a welded joint between two metallic sheets which have been welded together to form a single face sheet such as sheet 14 in FIGURE 1 in the panel upon which the novel inspection method disclosed herein was practiced to produce the pattern shown in FIGURE 6.

Use of the inventive method disclosed herein in connection with fabrication of a workpiece is illustrated by FIGURES 7 and 8. Thus, in connection with use of honeycomb panels on surfaces of high speed aerial or space vehicles at locations wherein boundary layer airflow is involved, it is necessary to provide panels of the stated type with a plurality of minute holes 52, each of which is centered with respect to the cell walls formed by the honeycomb core material in the panel. To locate accurately the precise center of each individual cell on the opposite side of the face sheet from which drilling is necessarily accomplished, the workpiece to be drilled is subjected to the novel method discussed above to produce a pattern on the coated surface thereof generally similar to the pattern shown by FIGURE 6. The printed pattern on the coating is appropriately treated with clear lacquer or other media to prevent smudging of the same, and remains affixed to the workpiece surface during the drilling operation. The precise location of each cell wall is obvious to the drilling operator by visually observing the printed pattern on the panel external surface. In the absence of the novel method disclosed herein, conventional methods for obtaining permanent records of inspection results in workpieces such as described above, even if precise delineation of cell walls could be achieved, would entail removal of film, paper, or other media from the workpiece in order to process the same, after which accurate correlation of the film or paper with the original workpiece to determine the exact location of cell walls shown on the record would be virtually impossible.

The inventive method disclosed herein has been found effective in connection with many different metals and alloys, including those having no residual magnetism, and workpieces of diverse sizes and shapes. Also, when the inspected object is not freely accessible for bench testing in a fixture, the method taught herein permits inspection or analysis of the object while installed in place, such as a honeycomb panel installed on a supersonic aerial or space vehicle. Thus, for example, a panel of the stated type may be mounted and affixed in the vehicle frame, and the more accessible face sheet surface on such panel may be coated with a printable layer as described above. A portable source of magnetic force may be used to create a localized fluctuating magnetic field which may then be moved over the entire panel surface proximate the face sheet opposite from the coated one to produce the desired printing action on the printable layer. The particles for producing the printed impression under the influence of the magnetic field may first be dispersed over the surface of a suitable supporting member such as a velvet cloth or a bed of loosely combed cotton or the like which is required to be magnetically porous in the sense that flux lines may pass freely through such material without any significant hindrance thereof. The cloth or other flexible and magnetically porous supporting member may then be held against or in close proximity with the coated workpiece surface and with the supported particles in contacting or closely confronting relationship with such surface while the magnetic field is created and the magnetic source is moved over the desired path, resulting in the printing action on the painted surface all as described more particularly hereinabove without loss of the particles such as might otherwise occur due to the effects of gravity. In conjunction with the foregoing procedure, a diamagnetic material such as an aluminum bar may be momentarily interposed between the magnetic source and the workpiece to enhance particle movement as mentioned above in connection with FIGURE 5.

Application of the inventive principles disclosed herein to determine the metallurgical configuration of metallic specimens is illustratively shown by FIGURES 13 through 16. FIGURE 13 shows a channel member 54 of material such as PH15–7Mo alloy having a composition specified hereinabove and fabricated by an extrusion process to form a channel of generally T-shaped cross-section. Raw material of the stated type is normally received from the rolling mill or other source in the annealed condition whereby austenitic structure is normally achieved throughout the member. In extruded parts as channel member 54 shown in FIGURE 13, ductility is normally desired in order to facilitate fabrication of parts from the raw material. In the so-called advanced alloy materials such as PH15–7Mo, a phenomenon known as segregation occasionally occurs whereby a constituent element such as nickel or chromium fails to diffuse uniformly throughout the matrix for various reasons, and differences in composition of the specimen on a microscopic scale sometimes result. Where such differences occur, application of heat to anneal the specimen sometimes produces a uniformly austenitic structure by diffusing the segregated element in the metallic solution. However, the rate of such diffusion depends upon the nature of the segregation and the precise element involved, and the diffusion rate for nickel or chromium, for example, is relatively lower than that associated with other elements in the precipitation hardenable alloy illustratively specified hereinabove. Moreover, some kinds of segregation or of particular elements do not respond to normal annealing processes and require higher temperatures and longer dwell times to produce diffusion. However, higher temperatures than those associated with annealing usually have an extremely deleterious effect upon the final physical properties of the specimen, resulting in rejection of the finished part.

Due to the necessity for determining that raw material or workpiece components such as channel 54 in FIGURE 13 are uniformly austenitic in structure throughout, a sample of such material is normally selected from a large quantity of billets or parts and subjected to appropriate inspection tests. Thus, a cross-sectional cut may be made through channel member 54 and the resulting surface 56 may be coated with a suitable agent such as the vinyl paint discussed hereinabove to prepare the test specimen for inspection. In contrast to the conventional methods for metallurgical inspection by etching, surface 56 of member 54 need not be finely polished or otherwise machined prior to inspection by the novel method disclosed herein. In practicing the stated method on channel member 54 the stated member after being coated on surface 56 as mentioned above is placed within a coil in the general manner shown in FIGURE 20 and rorresponding to placement of coils 28 around core 26 in FIGURE 5, although the workpiece may be situated in various other relationships with a source of magnetic force depending upon the precise size and shape of the coil or the workpiece. With channel member 54 appropriately placed so that lines of flux will penetrate surface 56 substantially perpendicular thereto, magnetic particles such as discussed above may be dusted onto surface 56 before or during the application of magnetic force to produce the flux field. Following removal of the magnetic particles from surface 56, a coating of clear lacquer may optionally be applied to surface 56 to prevent smudging of the resultant pattern, and the printed pattern may be peeled from surface 56 for detailed study as required. The vinyl paint discussed above is advantageous in facilitating the inspection process by reason of the fact that the printed pattern thereon may be reproduced on standard photographic sensitized paper using the vinyl strip as a negative. A copy of the pattern thus obtained from a specimen such as channel 54 in FIGURE 13 may be seen from FIGURE 15. The pattern was obtained from an extruded channel of PH15–7Mo material and the test conditions included exposure of the specimen to a magnetic field produced by 1200 amps of pulsating direct current at 60 c.p.s. for 5 seconds.

As seen from FIGURE 15, the metallurgical condition of member 54 shown in FIGURE 13 includes a relatively light area denoting an austenitic condition near the surface of the member, while a relatively darker generally T-shaped area corresponding to the overall shape of the mmeber lies near the center thereof. The darker area thus referred to denotes a precipitation hardened condition which may have resulted from any one of several possible causes. The printed record thus shown in FIGURE 15 reveals an extreme state of segregation wherein the annealed workpiece has an austenitic layer near the surface and a predominantly martensitic structure throughout most of the workpiece material and generally centered thereon. Moreover, detailed evaluation of the printed pattern from a metallurgical inspection test accomplished in accordance with the inventive principles taught therein by a metallurgist skilled in this technique can provide many clues relative to the cause of various abnormalities revealed by the inspection procedure, as well as indicating various methods for correcting or eliminating the defects thus revealed. For example, the condition shown by FIGURE 15 was not corrected by annealing the test specimen at elevated temperatures, from which it may be assumed that the abnormal condition involves segregation of nickel or chromium, while the nature of the pattern tends to indicate that the abnormality did not result from the extrusion process but must have existed in the billet from which the extrusion was initially formed. The extremely detailed and well defined pattern in FIGURE 15 includes shadings, lines or shadows indicating various metallurgical or microscopic details, the complete evaluation of which depends upon the skill and experience of the technician interpreting the test results. It suffices herein to point out that detailed information such as shown by FIGURE 15 has not been available to metallurgists by use of any method heretofore known to the prior art and suitable for mass production use.

A further example of the inventive principles taught herein as applied to metallurgical inspection of raw materials or workpiece components is illustrated by welded seam tubing specimen 57 of FIGURE 14 which may be coated with a suitable agent such as the vinyl paint disclosed hereinabove and exposed to a flux field after dusting with a paramagnetic particulate in the manner generally shown by FIGURES 1 through 3 and discussed above. A sample copy of a printed record thus obtained from a tubular specimen of AM350 material is shown in FIGURE 16. AM350 is an advanced steel alloy composed generally as follows:

| | Percent approx. |
|---|---|
| Crabon | 0.10 |
| Nickel | 4.2 |
| Chromium | 17.0 |
| Molybdenum | 2.8 |
| Iron, Balance. | |

The tubular specimen from which the printed record of FIGURE 16 was obtained had a smooth and highly polished or mirror-like appearance from which no discontinuities of structure or composition were apparent to the naked eye. In addition to the ease and rapidity of the novel process disclosed herein in inspecting workpieces such as that shown in FIGURE 14, it may be seen from FIGURE 16 that the effectiveness of the novel method in disclosing metallurgical structure is amazing in its detail and its scope. Thus, for example, the generally horizontal parallel lines 58 and 60 in FIGURE 16 define a weld seam on the surface of tubing 57 and which is invisible in the polished tube specimen, while reference numerals 62 and 64 of FIGURE 16 denote the workpiece material adjacent the stated seam on either side thereof and known generally as the heat affected zone. The workpiece area designated 62 and 64 includes that portion of the workpiece material situated adjacent the welding path and the temperature of which is raised so high during the application of welding heat as to affect adversely the physical properties of the stated zone. Since the base metal in the workpiece beyond the heat affected zone is relatively much cooler during the welding process, post-weld shrinkage of metal in the weld seam and the heat affected zone is considerable, while that occurring in the relatively cooler base metal is negligible or totally absent. As a result of the stated condition of differential shrinkage, a line or plane of incipient failure due to stress created between the stated portions of workpiece material occasionally results. An example of this defect is indicated by reference numeral 66 in FIGURE 16 designating a microscopic plane of weakness or incipient failure which is so minute as not to be revealed by conventional inspection methods. Further defects in the workpiece as revealed by FIGURE 16 are indicated by reference numerals 68 and 70 which designate portions of the weld seam wherein fusion was incomplete or otherwise formed a defective joint due to impurities, oxidation or other deleterious conditions in the zone of fusion. Local pockets or veins of retained austenite in the martensitic material forming the tubular specimen under discussion are also revealed by the record shown in FIGURE 16 and are designated by reference numerals 72, 74, 76, 78 and 80. Based upon the superior physical properties of steel in the martensitic state compared with those associated with austenitic steel, the stated localized areas of retained austenite constitute potential zones of failure which, if uncorrected, would normally require rejection of the workpiece.

Many other microscopic and metallurgical details in the composition and structure of the workpiece inspection record shown by FIGURE 16 are provided by the inventive method disclosed herein. Thus, for example, the zone generally designated by reference numeral 82 in the stated figure shows the granular direction of the metal to be generally horizontal in FIGURE 16, a feature which is similarly reflected by lines and shadows in many other portions of the printed pattern shown by the stated figure. Many other details not specifically treated herein are also revealed by the stated test results, and provide much useful information for evaluation by a skilled technician.

The inventive principles taught herein are further applicable to the study of stress patterns produced in specimens by the application of external loads thereon as illustrated by FIGURE 17. In the stated figure, a generally L-shaped specimen 81 is shown with arrows 84 and 86 denoting the direction in which two external loads are illustratively applied to specimen 81. Dotted lines 88 and 90 represent areas of stress within the workpiece material produced by the application of force in the stated manner. The areas of stress 88 and 90 may be revealed by coating specimen 81 with a suitable agent such as the vinyl paint discussed above, and dusting the specimen with metallic particles before or during the application of magnetic force to produce flux lines generally perpendicular to the coated surface of the specimen. The intensity of shading in areas of concentrated stress in a workpiece thus treated varies with respect to the shading in areas of the coated surface reflecting an absence of stress.

The inventive principles taught herein regarding stress patterns discussed above are further illustrated by FIGURES 18 and 19. FIGURE 18 shows a short length of curved tubing 92 such as may be produced by bending a straight section of tubing approximately 90 degrees. Tube bending of the stated type is usually accomplished by securely gripping one end of the straight tube section such as end portion 96 of workpiece 92 and pulling the stated end in an arcuate path corresponding generally to the curvature of a round center post against which the workpiece is held in continual contact by force applied at end 94.

FIGURE 19 shows a photographic print made from a strippable vinyl coat obtained from a tubing specimen such as described in connection with FIGURE 18 and fabricated from an advanced alloy of stainless steel similar to those described hereinabove. Residual stress in the tube resulting from the bending process is clearly apparent from the printed record of FIGURE 19 as shown by the relatively dark shaded stripes 98 separated by lighter stripes. It will be understood by those familiar with the tube bending art that the outer radial portion 100 of the curved tubing specimen 92 is in tension while the inner radial portion 102 is primarily in compression. The characteristic sweep of the shaded stripes 98 is due to the fact that relatively greater tension occurs at the outer radial portion of the tubing during bending than that occurring at the top and bottom center areas along the tube, whereby stripes 98 are wider along the area designated by reference number 100 in FIGURE 19 than along the line midway between areas 100 and 102. Moreover, elongation of the material in workpiece 92 is necessarily greater near the outer radius of curvature than along the inner radius, with the result that stripes 98 are closer together as the inner radius of curvature is approached.

While the particular details of the structures and methods set forth above and shown in the drawings are fully capable of achieving the objects and providing the advantages herein stated, the details thus disclosed are merely illustrative and could be varied or modified to produce equivalent results without departing from the scope of the inventive concept as defined in the appended claims.

I claim:

1. In a method of magnetically inspecting an object by exposure of said object to a magnetic field to influence the location of paramagnetic particles on the surface of said object due to variations in magnetic permeability of said object causing variation in flux concentration of said field and corresponding variation in attraction of said particles;
- placing a paramagnetic particulate on said surface,
- establishing a concentration of lines of magnetic flux in relationship to said object whereby said lines of flux penetrate said surface in a dominant direction substantially perpendicular to the same, and
- sufficiently fluctuating the intensity of said magnetic flux to cause impingement of said particulate leaving marks upon said surface after removal of said particulate from said surface.

2. The method of analyzing a metallic specimen comprising the steps of:
- dusting onto at least one surface of said specimen a magnetically responsive particulate in a substantially dry state capable of printing on said surface when impinged thereagainst, and
- exposing said specimen to lines of magnetic flux substantially perpendicular to said surface and of varying intensity and sufficient force to cause said particulate to impinge against said surface, and to leave a printed mark thereon after removal of said particulate from said surface, due to variations in magnetic permeability of said specimen causing variation in flux concentration of said magnetic flux and corresponding variation in attraction of said particulate.

3. The method set forth in claim 2 above wherein:
- said magnetic force is characterized by periodic reversal in the direction of said magnetic force.

4. The method of analyzing a metallic specimen having variations in magnetic permeability, which variations cause variation in flux concentration of magnetic flux directed through said specimen and corresponding variation in attraction of a magnetically responsive particulate, comprising the steps of:
- distributing on a flexible, magnetically porous supporting member a magnetically responsive particulate in a substantially dry state capable of printing marks on a surface of said specimen when impinged thereagainst so that said marks remain after said member and said particulate are removed from close proximity to said surface, placing said supporting member in close juxtaposition with said surface, and exposing said specimen and said particulate to lines of magnetic flux of varying intensity and sufficient force to cause said particulate to impinge against said surface and print said marks, said flux lines being oriented so as to penetrate through said member and said surface.

5. The method set forth in claim 4 above wherein: said flexible member comprises velvet material.

6. The method of analyzing a metallic specimen comprising the steps of:

providing the surface of said specimen with a layer of dry material capable of receiving a printed impression from an agent, exposing said specimen to a magnetic flux field of fluctuating intensity with the lines of flux penetrating and passing through said layer, and providing a megnetically responsive particulate in a substantially dry state comprising said agent on said layer whereby movement of said particulate in response to said variations in field intensity causes printing by said agent on said layer due to impingement of said particulate thereagainst, said printing having variations of intensity due to variations in flux concentration caused by variations in magnetic permeability of said specimen.

7. The method set forth in claim 6 above wherein: said lines of flux are substantially perpendicular to said surface.

8. The method set forth in claim 6 above wherein: said particulate comprises particles of iron oxide.

9. The method set forth in claim 6 above wherein: said layer comprises a plastic paint.

10. The method set forth in claim 9 above wherein: said plastic paint comprises a resin.

11. The method set forth in claim 10 above wherein: said resin consists of a vinyl paint.

12. The method set forth in claim 9 above wherein: said agent includes color pigment of contrasting shade relative to said plastic paint.

13. The method of evaluating a metallic specimen comprising:

exposing at least a portion of said specimen to a pulsating magnetic field having lines of flux intersecting said portion, and bringing a quantity of paramagnetic particles sufficiently close to said portion to impinge thereagainst under the influence of said field and leave a printed pattern thereon which remains after all said particles are removed therefrom, said particles having printing properties under the influence of said magnetic field, said specimen having variations in magnetic permeability causing variation in flux concentration of said field and corresponding variation in attraction of said particles.

14. The method set forth in claim 13 above including in addition thereto, the preparatory steps of:

applying a magnetically porous coating to said portion, and allowing said coating to become substantially dry, said dry coating being adapted to receive said printed pattern.

15. The method of evaluating defects in a workpiece comprising:

coating a surface of said workpiece with a magnetically porous layer adapted in the substantially dry state to receive printed marks when violently contacted by an agent, depositing on said surface a paramagnetic particulate including said agent, exposing said workpiece to a magnetic field having flux lines penetrating said surface and of fluctuating intensity having sufficient variation to cause oscillating impact of said particulate upon said surface resulting in printed marks thereon by said agent, and removing said workpiece from said field and said particles from said surface, said workpiece having variations in magnetic permeability causing variation in flux concentration of said magnetic field and corresponding variation in attraction of said particles.

16. The method set forth in claim 15 above including in addition thereto:

separating said layer from said surface with said pattern remaining substantially intact on said layer.

17. The method set forth in claim 16 above including in addition thereto:

applying a coating of relatively quick-drying lacquer to said printed marks after removal of said particulate therefrom whereby said marks remain substantially intact.

18. The method set forth in claim 17 above wherein: said layer comprises a vinyl paint sprayed onto said surface and then dried, and said lacquer is sprayed over said marks.

19. The method set forth in claim 18 above including in addition thereto:

copying said marks onto photosensitive paper by normal well-known photographic printing techniques using said layer as a negative.

20. The method of metallurgically analyzing a specimen having variations in magnetic permeability capable of causing variation in flux concentration of flux lines penetrating a surface of said specimen with corresponding variation in attraction of a magnetically responsive particulate applied to said surface, said method comprising:

placing said specimen in close juxtaposition with a coiled conductor, passing a non-uniform current through said conductor to produce a magnetic field of fluctuating intensity having flux lines penetrating a surface of said specimen and substantially normal thereto, and applying to said surface a magnetically responsive particulate adapted to leave a printed pattern upon said surface when impinged thereagainst under the influence of said magnetic field.

21. The method of metallurgically analyzing a generally elongate specimen having variations in magnetic permeability capable of causing variation in flux concentration of flux lines emitted from an end of said specimen with corresponding variation in attraction of magnetically responsive particulate dusted onto said end, said method comprising:

placing said specimen concentrically within a coiled conductor, passing a current of varying amplitude through said conductor to produce a magnetic field of fluctuating intensity having flux lines emitting from the ends of said generally elongate specimen, providing said specimen with a substantially plane surface thereon transverse to the longitudinal axis of said specimen at an end thereof, and dusting onto said surface a material consisting of a magnetically responsive particulate adapted to leave a printed pattern upon said surface when impinged thereagainst under the influence of said magnetic field.

22. The method set forth in claim 21 above wherein: said elongate specimen is positioned so as to form a core within said coil.

23. The method set forth in claim 20 above including in addition thereto:

the preparatory step of providing said surface with a layer of material adapted to receive printed markings from said particulate which remain after said particulate is removed from said material.

24. The method set forth in claim 23 above wherein:
said layer of material comprises a vinyl plastic paint strippable from said surface after drying thereon, and
further including the final step of removing said layer from said surface.

25. The method set forth in claim 24 above further including the step of:
printing said pattern on photosensitive paper using said layer as a negative.

26. The method of determining subsurface configuration in a metallic object by analysis of a printed pattern produced on a surface of said object adapted to receive a printed impression from an agent, said object having variations in magnetic permeability capable of causing variation in flux concentration of a magnetic field penetrating said surface and corresponding variation in attraction of paramagnetic particles placed on said surface, said method comprising:
placing a plurality of paramagnetic particles including said agent and in a substantially dry state in close proximity with said surface,
producing a magnetic field having flux lines oriented in a dominant direction substantially normal to and penetrating said surface, and
causing sufficient fluctuation in the magnetic intensity of said field to produce repeated impact of said particles upon said surface whereby said agent prints said pattern thereon.

27. A method of determining subsurface configurations in a metallic object comprising the steps of:
providing a layer of material on a first surface of said object, said material being adapted to receive a printed impression from a paramagnetic agent in particulate form and said material further conforming in general to the contours of said first surface,
placing said paramagnetic agent in close proximity with said layer,
placing a source of magnetic force proximate a second surface of said object opposite from said first surface, and
energizing said magnetic source by means producing a fluctuating field of varying intensity and sufficient force to cause said paramagnetic agent to impinge forcefully against said layer and to print an impression thereon,
said metallic object having variations in magnetic permeability causing variation in flux concentration of said field and corresponding variation in attraction of said paramagnetic agent, and said impression remaining after said paramagnetic agent is removed.

28. The method set forth in claim 27 above wherein:
said magnetic source is movable, and including the step of moving said source relative to said object to cause flux lines emanating from said source to penetrate a portion of said surface.

29. The method of detecting stress in a metallic workpiece comprising:
coating a surface of said workpiece with a layer adapted to receive a legible printed impression from an agent,
applying an external load to said workpiece producing stress in the workpiece material,
depositing a magnetically responsive particulate including said agent in close proximity to said layer,
exposing said workpiece and said particulate to a pulsating magnetic field characterized by lines of flux penetrating said layer and causing said agent to print upon said layer due to impingement of said particulate thereon, and
observing the stress in said workpiece as defined by said printed impression,
said stress causing variations in magnetic permeability of said object resulting in variation of flux concentration of said magnetic field with corresponding variation in attraction of said magnetically responsive particulate.

30. The method set forth in claim 29 above wherein:
said layer comprises a strippable vinyl paint,
said method further including the step of stripping said layer with said printed impression thereon off of said workpiece after said particle impingement.

31. The method set forth in claim 30 above, further including:
printing copies of said printed impression on sensitized paper by normal photographic printing methods using said stripped layer as a photographic negative.

References Cited

UNITED STATES PATENTS

| | | | |
|---|---|---|---|
| 1,426,384 | 8/1922 | Hoke | 324—38 |
| 2,057,091 | 10/1936 | Eurich et al. | 324—38 |
| 2,061,692 | 11/1936 | Bagley | 324—39 |

FOREIGN PATENTS

| | | |
|---|---|---|
| 833,884 | 5/1960 | Great Britain. |

OTHER REFERENCES

Pevar, M.; New Magnetic Test Includes Stainless Steels; Product Engineering, vol. 32, No. 6, Feb. 6, 1961, pp. 41–43.

RUDOLPH V. ROLINEC, *Primary Examiner.*

WALTER L. CARLSON, *Examiner.*

R. J. CORCORAN, *Assistant Examiner.*